US012333188B2

(12) United States Patent
Segev et al.

(10) Patent No.: US 12,333,188 B2
(45) Date of Patent: Jun. 17, 2025

(54) BANDWIDTH BALANCING FOR A SINGLE NAMESPACE TENANT IN MULTI-FUNCTION NONVOLATILE MEMORY EXPRESS DEVICES

(71) Applicant: Western Digital Technologies, Inc., San Jose, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 168 days.

(21) Appl. No.: 18/351,351

(22) Filed: Jul. 12, 2023

(65) Prior Publication Data
US 2024/0053927 A1 Feb. 15, 2024

Related U.S. Application Data

(60) Provisional application No. 63/397,660, filed on Aug. 12, 2022.

(51) Int. Cl.
*G06F 3/06* (2006.01)
(52) U.S. Cl.
CPC .......... *G06F 3/0659* (2013.01); *G06F 3/0658* (2013.01); *G06F 3/0604* (2013.01); *G06F 3/0679* (2013.01)

(58) Field of Classification Search
CPC .... G06F 3/0613; G06F 3/0659; G06F 3/0658; G06F 3/0679; G06F 3/0604
USPC .......................................................... 710/29
See application file for complete search history.

(56) References Cited

U.S. PATENT DOCUMENTS

| | | | |
|---|---|---|---|
| 2006/0277126 A1* | 12/2006 | Rosenbluth | G06Q 40/00 |
| | | | 705/35 |
| 2008/0198671 A1* | 8/2008 | Wang | G06F 5/065 |
| | | | 365/189.05 |
| 2018/0341410 A1* | 11/2018 | Benisty | G06F 3/0659 |
| 2021/0200568 A1* | 7/2021 | Sharma | G06F 9/45558 |

* cited by examiner

*Primary Examiner* — Chun Kuan Lee
(74) *Attorney, Agent, or Firm* — PATTERSON + SHERIDAN, LLP

(57) ABSTRACT

The present disclosure generally relates to more effective utilization of write and read bandwidth in submission queues (SQs). The data storage device treats a SQ as two separate SQs: one write SQ and one read SQ. Rather than a single fetch pointer for the entire SQ, the write SQ has a write fetch pointer (WFP) while the read SQ has a separate read fetch pointer (RFP). So long as the individual pointers are less than a queue pointer (QP), the data storage device can still process commands for either read or write SQ even if the other SQ has run out of credits. In so doing, read and write bandwidths can be effectively utilized.

20 Claims, 10 Drawing Sheets

BANDWIDTH BALANCING FOR A SINGLE NAMESPACE TENANT IN MULTI-FUNCTION NONVOLATILE MEMORY EXPRESS DEVICES

CROSS-REFERENCE TO RELATED APPLICATIONS

This application claims benefit of U.S. Provisional Patent Application Ser. No. 63/397,660, filed Aug. 12, 2022, which is herein incorporated by reference.

BACKGROUND OF THE DISCLOSURE

Field of the Disclosure

Embodiments of the present disclosure generally relate to improved submission queue (SQ) utilization.

Description of the Related Art mom Multi-Function NVMe Devices (MFNDs) support SQs per function. Each function is guaranteed a read and write bandwidth. In FIG. 3, three different tenants (i.e., functions are shown) with different bandwidths between the tenants and between write and read bandwidths. Tenant 1 requires about fifty percent of the read bandwidth, but only about twenty five percent of the write bandwidth. Tenant 2 requires about twenty five percent of the read bandwidth, but about fifty percent of the write bandwidth. Tenant 3 requires about twenty five percent of the read bandwidth and about twenty five percent of the write bandwidth. Hence, all available bandwidth is distributed between three tenants.

The basic idea is that in every time slot each tenant is provided with the required credits (for both reads and writes) and those credits are consumed as commands are being fetched (i.e., a command of a large length will consume more bandwidth than a short command). A credit counter, shown in FIG. 4, per read/write is utilized to administer credit usage. When the credit goes to 0, the data storage device will stop fetching commands from SQs associated with a function (e.g., a virtual function).

The problem can be observed in FIG. 5. As shown in FIG. 5, Tenant 1 holds eight commands in the queue: read (1), write (2), read (3), read (4), write (5), write (6), read (7), and read (8). For simplicity of example, the overall read and write bandwidths are the same, all of the commands are of the same size, and the commands consume one eighth of the total bandwidth. Tenant 1 should receive fifty percent of the total bandwidth for reads and twenty five percent of the total bandwidth for writes based upon the example of FIG. 3.

Using the example numbers, the data storage device performs the following steps. At the start of the corresponding time slot, the controller provides four of eight read credits (i.e., fifty percent of the read bandwidth) and two of eight write credits (i.e., twenty five percent of the write bandwidth). The controller also fetches the first read command (i.e., read (1)), reduces the read credit to three of eight, and leaves the write credit unchanged at two of eight. The controller then fetches the first write command (i.e., write (2)), reduces the write credit to one of eight, and leaves the read credit unchanged at three of eight. The controller then fetches the second read command (i.e., read (3)), reduces the read credit to two of eight, and leaves the write credit unchanged at one of eight. The controller then fetches the third read command (i.e., read (4)), reduces the read credit to one of eight, and leaves the write credit unchanged at one of eight. The controller then fetches the second write command (i.e., write (5)), reduces the write credit to zero of eight, and leaves the read credit unchanged at one of eight. Because the write credit is now at zero, the controller stops fetching from the SQ belonging to Tenant 1. However, the data storage device is left with one of eight credits for reads which have not been utilized and there are more read commands available (i.e., read (7) & read (8)) to be executed.

Therefore, there is a need in the art for more effective utilization of SQs.

SUMMARY OF THE DISCLOSURE

The present disclosure generally relates to more effective utilization of write and read bandwidth in submission queues (SQs). The data storage device treats a SQ as two separate SQs: one write SQ and one read SQ. Rather than a single fetch pointer for the entire SQ, the write SQ has a write fetch pointer (WFP) while the read SQ has a separate read fetch pointer (RFP). So long as the individual pointers are less than a queue pointer (QP), the data storage device can still process commands for either read or write SQ even if the other SQ has run out of credits. In so doing, read and write bandwidths can be effectively utilized.

In one embodiment, a data storage device comprises: a first memory device; and a controller coupled to the memory device, wherein the controller is configured to: receive a command from a host device; increase a QP; provide write credits (WCs) and read credits (RCs); determine that either: a WFP is less than the QP and a WC is greater than 0; or a RFP is less than the QP and a RC is greater than 0; process the command; increment either: the WFP by 1; or the RFP by 1; and decrement either the WC or the RC.

In another embodiment, a data storage device comprises: a memory device; and a controller coupled to the memory device, wherein the controller is configured to: retrieve a command from a SQ; treat the SQ as two separate SQs including a first write SQ and a first read SQ; allocate WCs to the first write SQ; allocate RCs to the first read SQ; process write commands when WCs are greater than 0 and RCs are equal to or greater than 0; and process read commands when RCs are greater than 0 and WCs are equal to or greater than 0.

In another embodiment, a data storage device comprises: memory means; a controller coupled to the memory means, wherein the controller is configured to: treat a SQ as a write SQ and a separate read SQ; allocate one or more credits to the write SQ and the read SQ; and one or more of the following: advance a WFP, wherein the WFP is advanced if the following conditions are met: the WFP is less than a QP and a RFP; and WCs are greater than 0; and advance the RFP, wherein the RFP is advanced if the following conditions are met: the RFP is less than the QP and WFP; and RCs are greater than 0.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim (s).

The present disclosure generally relates to more effective utilization of write and read bandwidth in submission queues (SQs). The data storage device treats a SQ as two separate SQs: one write SQ and one read SQ. Rather than a single fetch pointer for the entire SQ, the write SQ has a write fetch pointer (WFP) while the read SQ has a separate read fetch pointer (RFP). So long as the individual pointers are less than a queue pointer (QP), the data storage device can still process commands for either read or write SQ even if the other SQ has run out of credits. In so doing, read and write bandwidths can be effectively utilized.

One manner to effectively utilize read and write bandwidths is to sacrifice device performance, but sacrificing performance is not desired. Another approach is to have each tenant hold a separate SQ for reads and a separate SQ for writes, but such an arrangement cannot be guaranteed. Thus, more effective utilization can be accomplished utilizing one SQ as two separate SQs.

Figure 1:
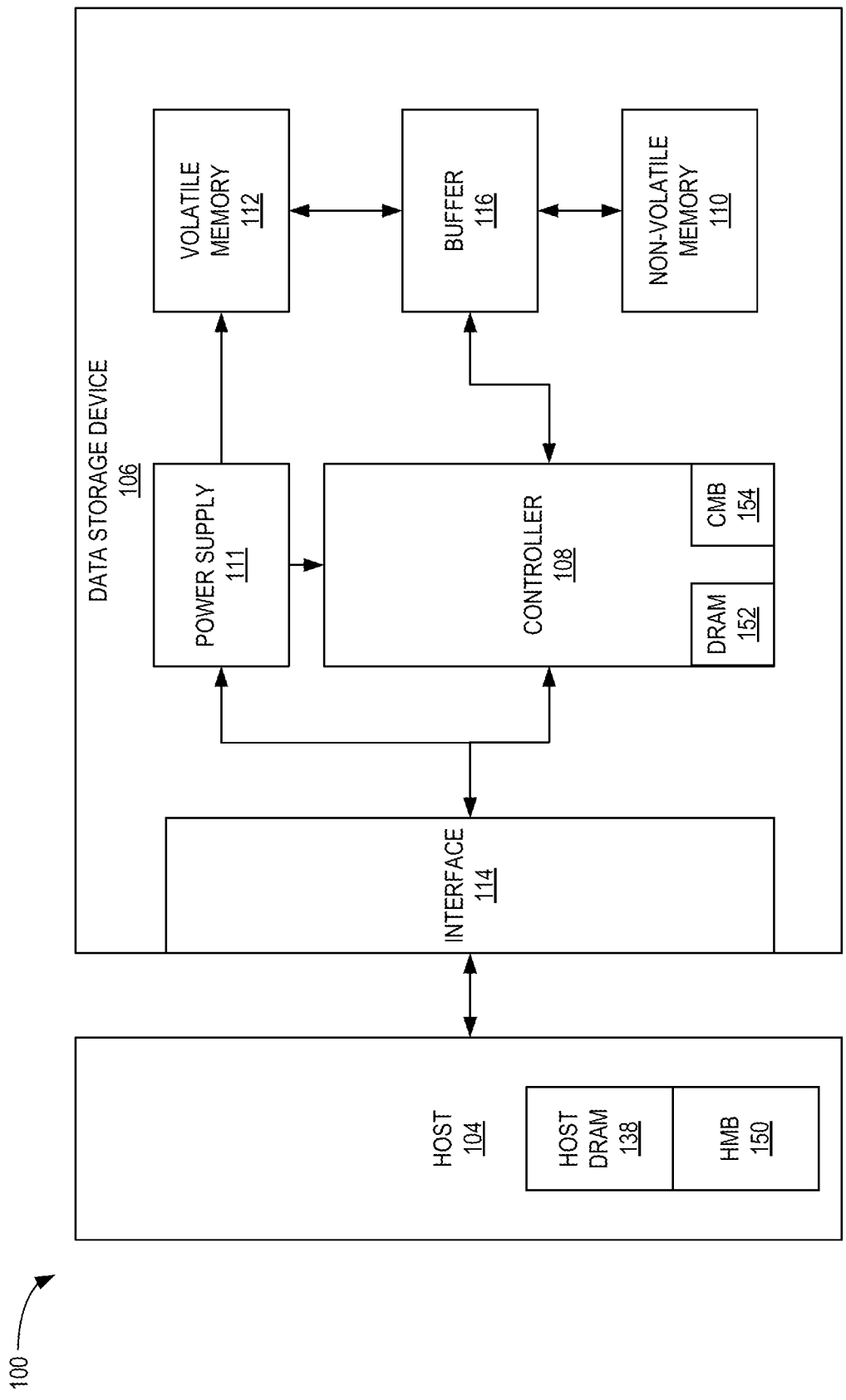
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138 and, optionally, a host memory buffer 150. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. The controller 108 may include volatile memory such as DRAM 152 as well as a controller memory buffer (CMB) dedicated for host device 104 usage. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIex1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory), which may be SRAM memory, prior to sending the data to the NVM 110.

Figure 2:
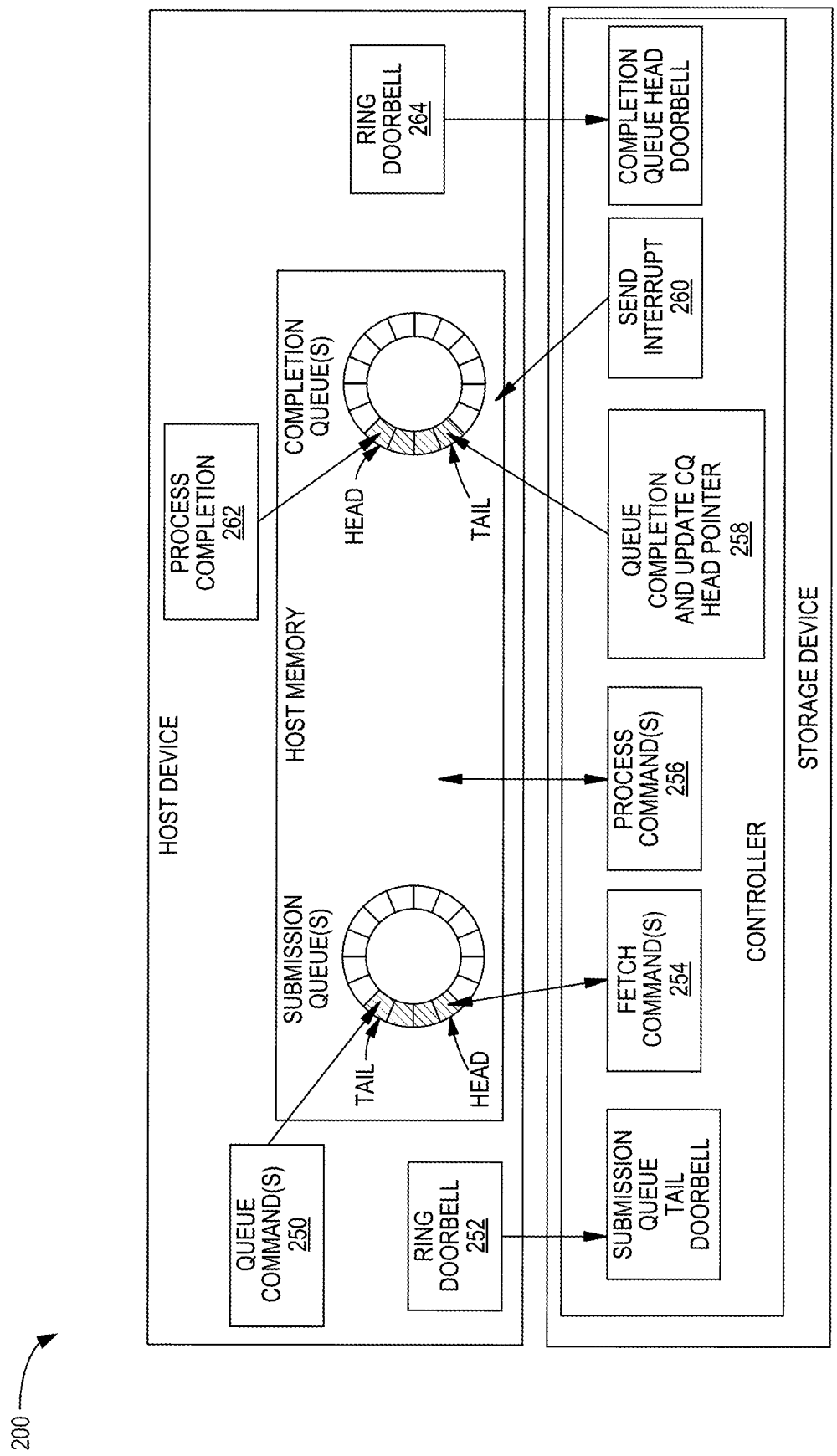
FIG. 2 is a block diagram illustrating a method of operating a storage device to execute a read or write command, according to certain embodiments.
Figure 3:
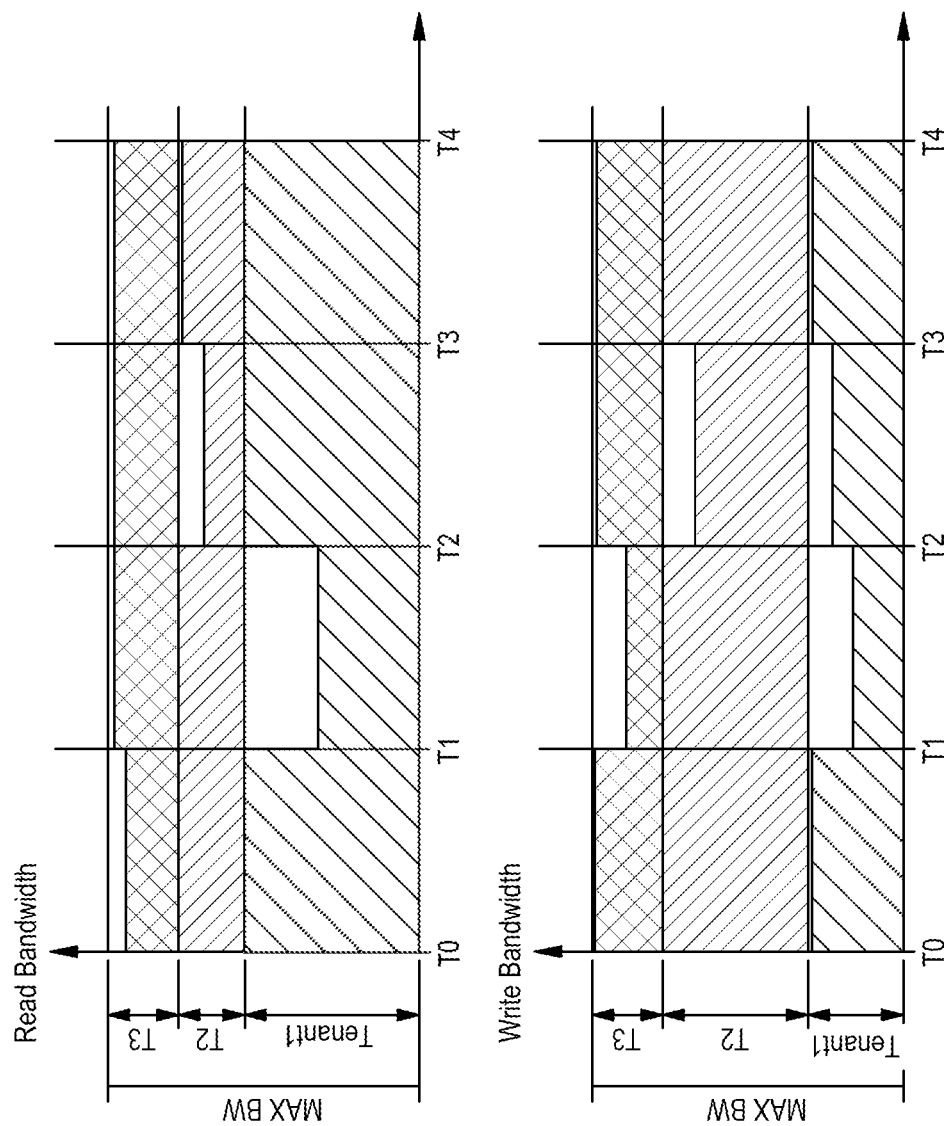
FIG. 3 is a schematic illustration of bandwidth distribution according to one embodiment.
Figure 4:
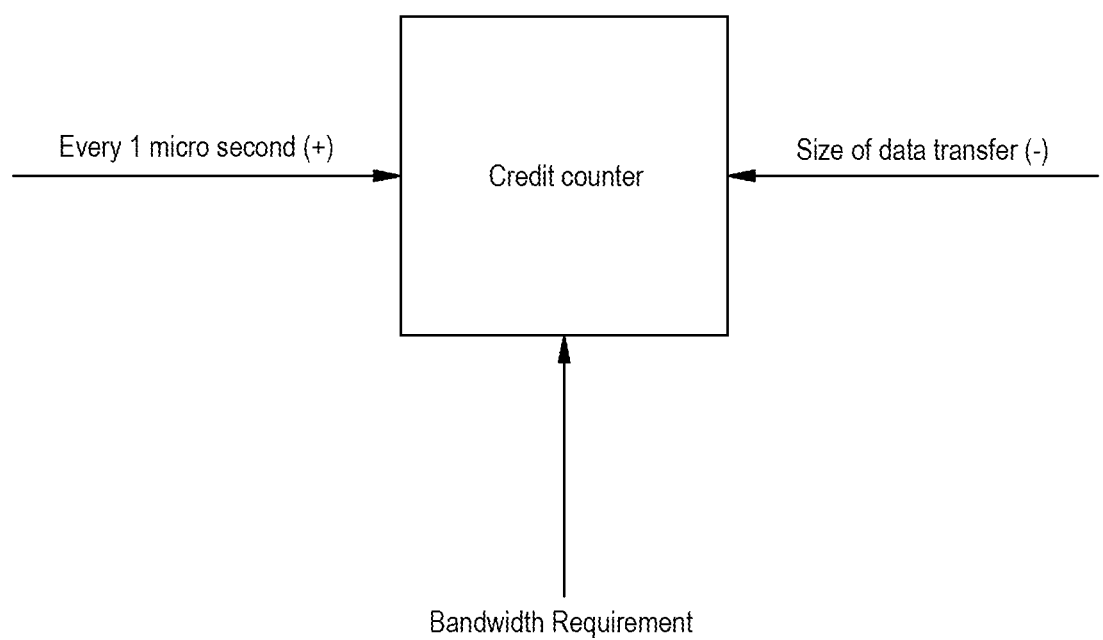
FIG. 4 is a schematic illustration of a credit counter according to one embodiment.

FIG. 2 is a block diagram illustrating a method 200 of operating a storage device to execute a read or write command, according to one embodiment. Method 200 may be used with the storage system 100 of FIG. 1 having the host device 104 and the data storage device 106, where the data storage device includes the controller 108.

Method 200 begins at operation 250, where the host device writes a command into a SQ as an entry. The host device may write one or more commands into the SQ at operation 250. The commands may be read commands or write commands. The host device may comprise one or more SQs.

In operation 252, the host device writes one or more updated SQ tail pointers and rings a doorbell or sends an interrupt signal to notify or signal the storage device of the new command that is ready to be executed. The host device may write an updated SQ tail pointer and send a doorbell or interrupt signal for each of the SQs if there are more than one SQs. In operation 254, in response to receiving the doorbell or interrupt signal, a controller of the data storage device fetches the command from the one or more SQs, and the controller receives the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue (CQ) of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the CQ is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 6:
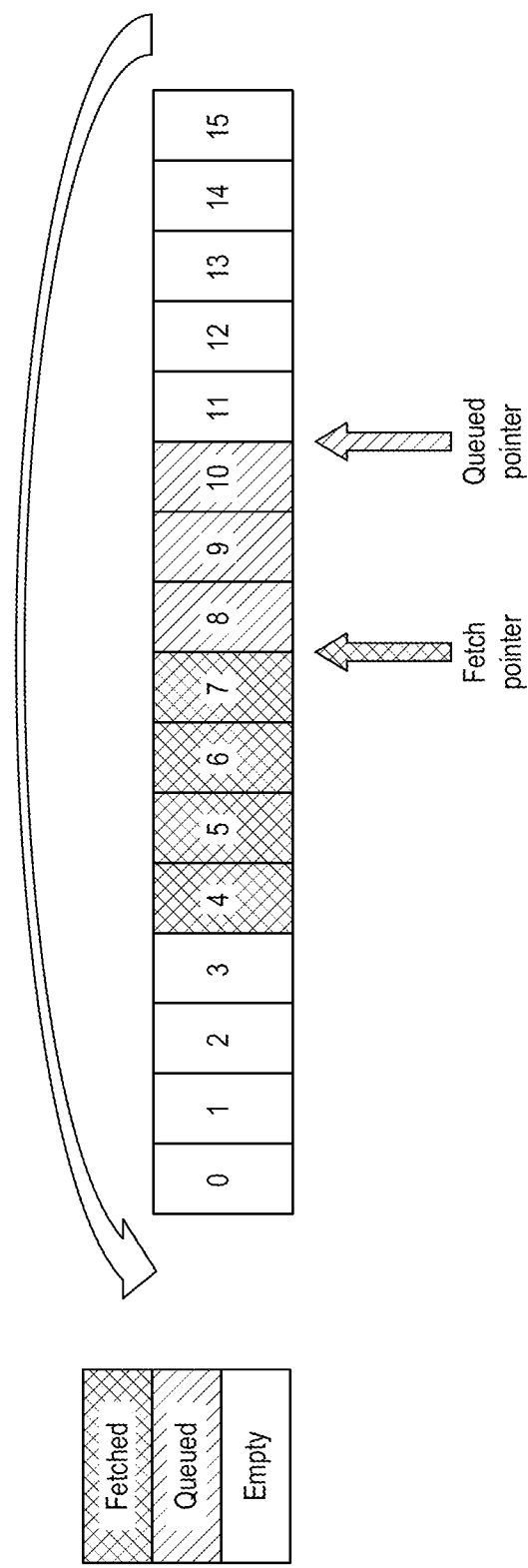
FIG. 6 is a schematic illustration of a fetching algorithm according to one embodiment.

FIG. 6 is a schematic illustration of a fetching algorithm according to one embodiment. In FIG. 6, a SQ is shown with sixteen entries. Seven of the sixteen entries are pending completion (from a host device perspective) from command four to command ten. The data storage device holds two pointers. A fetch pointer, telling the data storage device where to start fetching the next command, and a queued pointer (i.e., doorbell) telling the data storage device the last command that can be fetched. In the example, four of the seven entries the device already are fetched (4-7) and three more can still be fetched (8-10). Whenever the data storage device fetches a command, the controller increments the fetch pointer. The data storage device ensures the data storage device never fetches more than the queued pointer. The SQs are cyclic in nature, and the data storage device also has a way to inform the host device when the data storage device can re-write entries.

Figure 7:
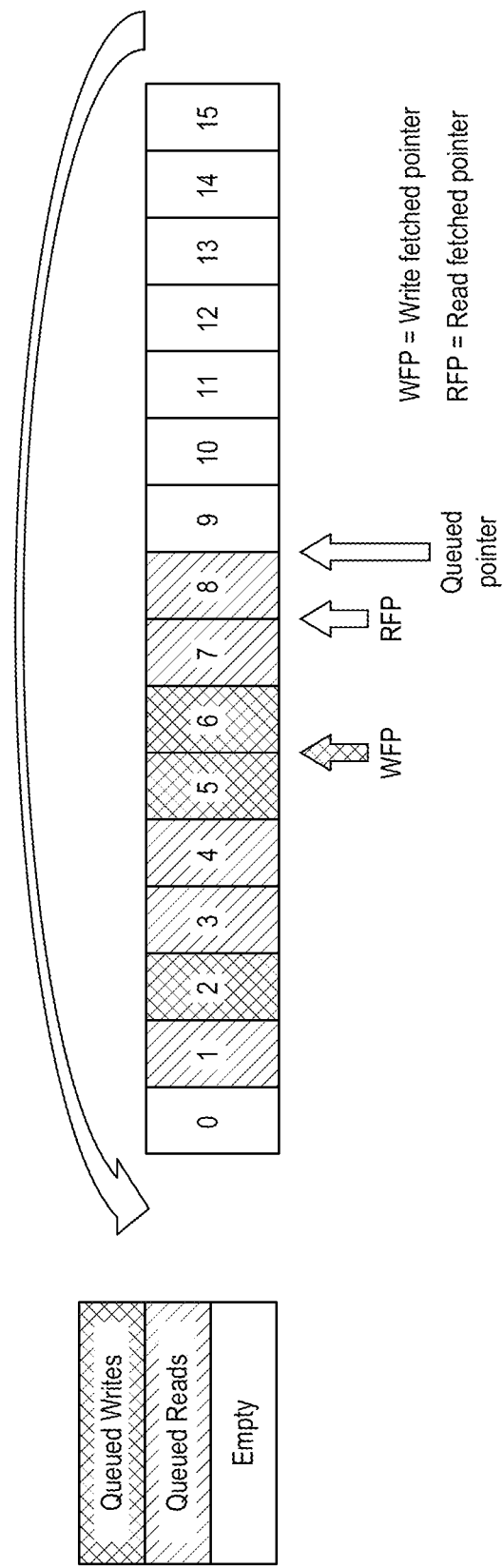
FIG. 7 is a schematic illustration of a fetching algorithm according to another embodiment.

FIG. 7 is a schematic illustration of a fetching algorithm according to another embodiment. The fetching algorithm uses two fetch pointers per the relevant SQ. The example of FIG. 7 corresponds to the same example shown in FIG. 5, but utilizing the two fetch pointers. In this example the host device queued eight commands: read (1), write (2), read (3), read (4), write (5), write (6), read (7) and read (8). The data storage device in this example has fetched commands read (1), write (2), read (3), read (4), write (5), and read (7), but has not fetched write (6) or read (8).

Figure 5:
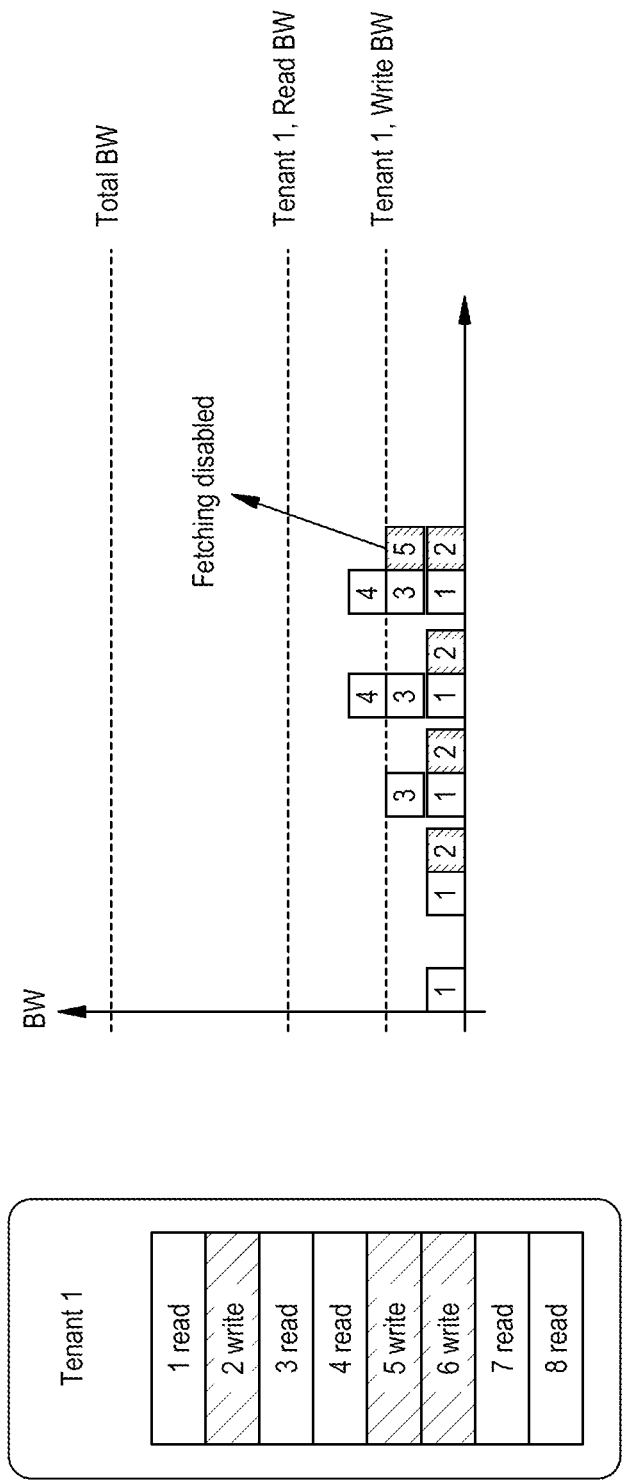
FIG. 5 is a schematic illustration of write limiting reads according to one embodiment.

The reason write (6) has not been fetched is because the write credits have all be used up, the same as discussed in FIG. 5, and hence, write (6) cannot be fetched and the write SQ is disabled. The difference between FIG. 5 and FIG. 7 is that in FIG. 5, fetching from the SQ for Tenant 1 cannot continue past write (5) because the SQ is treated as a single SQ. In FIG. 7, by contrast, the SQ is treated as separate write and read SQs. Hence, while all of the write credits have been used following fetching write (5), there are still read credits to use and hence read (7) can be fetched even though write (6) cannot be fetched. In other words, fetching continues past write (5) for FIG. 7, but stops after write (5) in FIG. 5. Additionally, read (8) is not fetched In FIG. 7 because read (7) utilized the last read credit and hence, the read SQ is disabled after fetching read (7). Thus, after fetching read (7), all write and read credits have been used and both the write SQ and the read SQ are disabled for Tenant 1. In sum, FIG. 5 shows that write (6), read (7), and read (8) are not fetched because only a single SQ is used while FIG. 7 shows that write (6) and read (8) are not fetched, and read (7) is fetched, due to the presence of separate write and read SQs.

Figure 8:
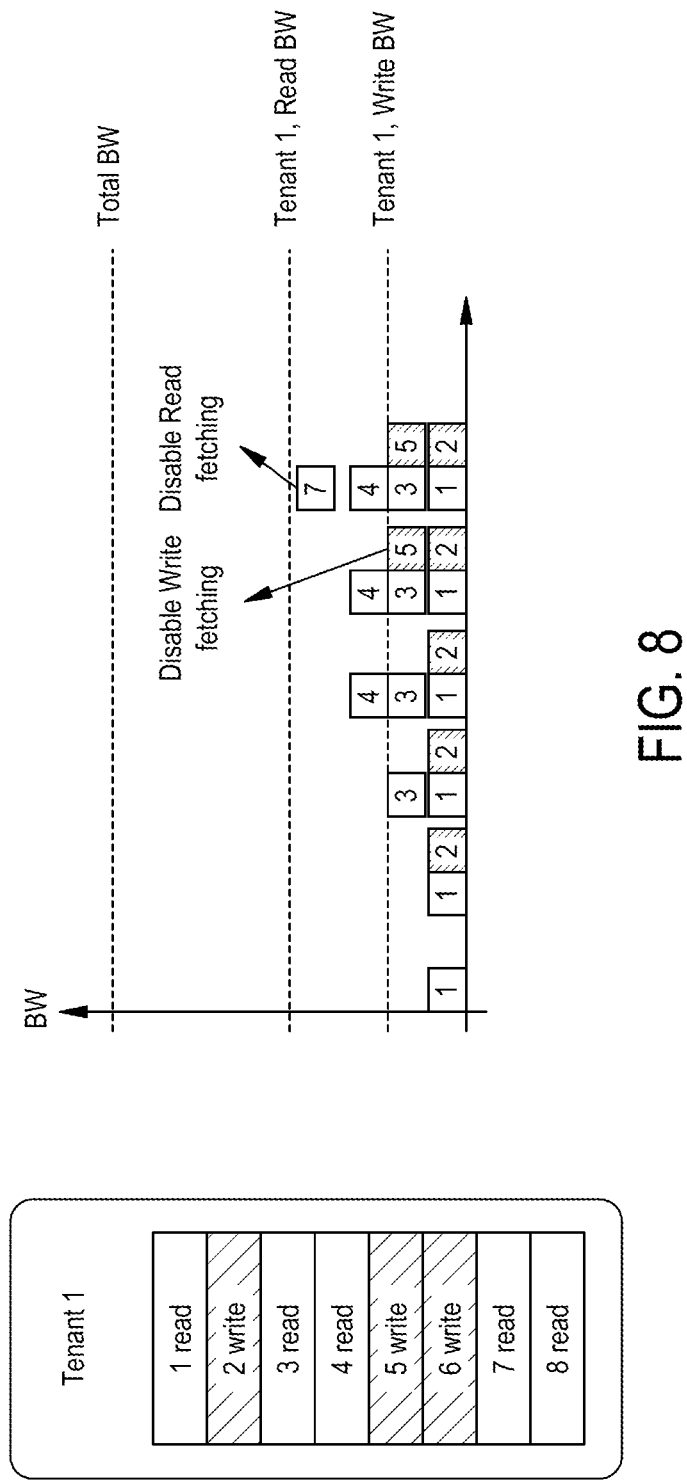
FIG. 8 is a schematic illustration of full bandwidth utilization according to one embodiment.

FIG. 8 is a schematic illustration of full bandwidth utilization according to one embodiment. FIG. 8 shows the full bandwidth utilization of the fetching algorithm example shown in FIG. 7. Following the example, when write (5) is fetched, the data storage device continues to fetch read commands, and in particular read (7), so that the data storage device can utilize all of the read bandwidth as well.

Figure 9:
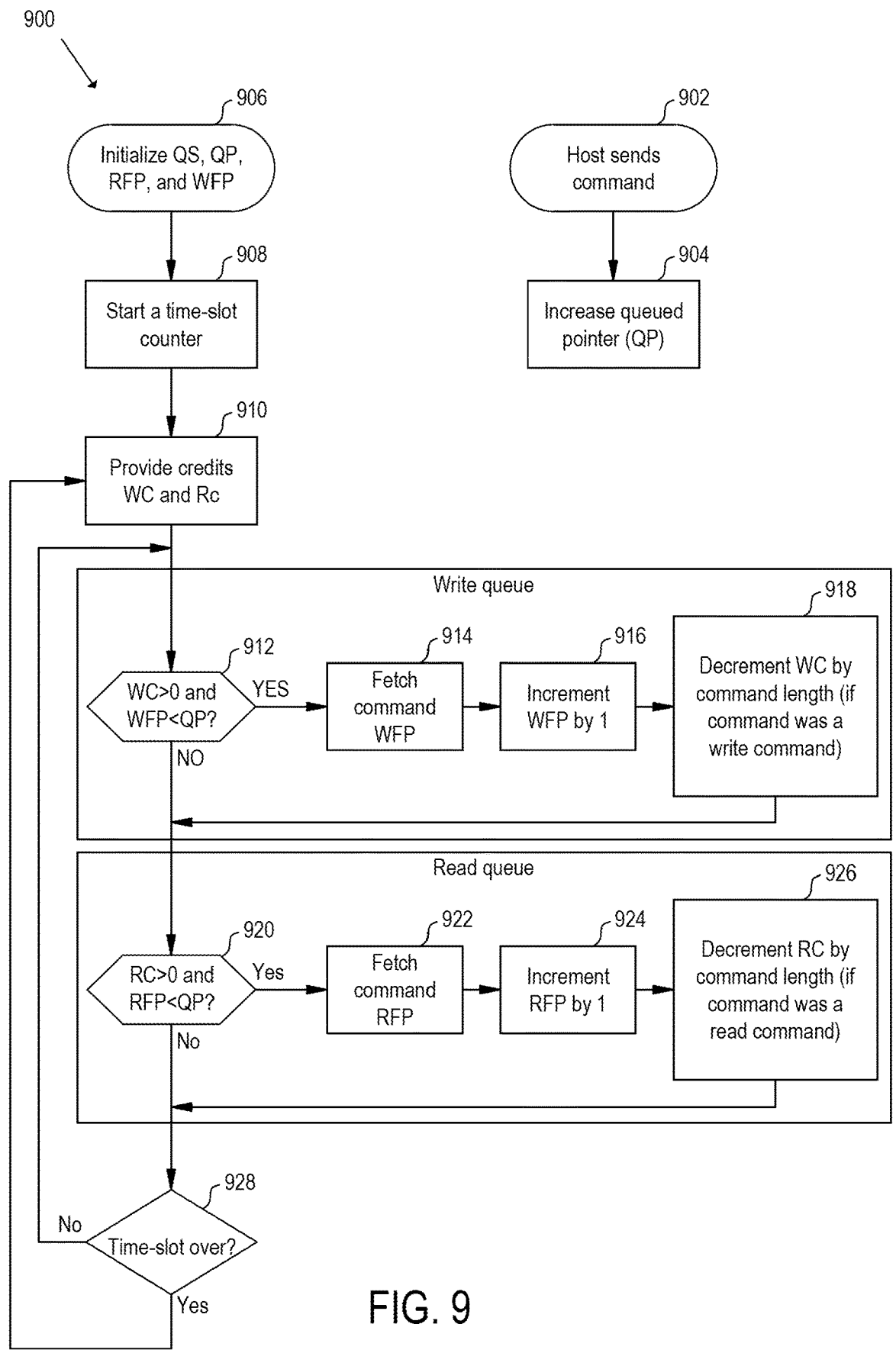
FIG. 9 is a flowchart illustrating a split submission queue (SQ) algorithm according to one embodiment.

FIG. 9 is a flowchart 900 illustrating a split SQ algorithm according to one embodiment. FIG. 9 shows generating two SQs out of a single SQ. There are two flows shown FIG. 9, but the flow on the right is just mentioned here for "completeness". When the host device sends a command at 902, the host device rings a doorbell or sends an interrupt, which causes the queued pointer (QP) to be increased at 904. The flowchart on the left deals with all of the other parameters.

To being the process, the controller initializes the queue size (QS), the QP to 0, the read fetched pointer (RFP) to 0, and the write fetched pointer (WFP) to 0 at 906. After initialization, a time-slot (e.g., 10 uSec) is started at 908, and the controller than gives credits, such as read credits (RC) and write credits (WC), at 910 which are used for the read bandwidth and write bandwidth for the SQ.

The process then proceeds to handling the write queue though it should be understood that the read queue could be handled prior to the write queue. In the write queue, a determination is made at 912 regarding whether the WC is greater than 0 and the WFP is less than QP. If yes to both, then the process continues to 914, but if no at 912 to either, the process continues to 920. If yes to both at 912, then at 914, the controller fetches the command WFP followed by incrementing WFP by 1 at 916. If the command was a write command, then WC is decremented by the command length at 918 followed by proceeding to 920.

If no at 912, then the controller makes a determination at 920 regarding whether RC is greater than 0 and RFP is less than QP. If yes to both, then the controller fetches the command RFP at 922 followed by incrementing RFP by 1 at 924. If the command was a read command, then RC is decremented by the command length at 926 followed by determining whether the time-slot is over at 928. If no at 928, the process simply proceeds back to 912. If the time-slot is over, then the process returns to 910.

Generally speaking, for the write SQ, the controller checks if the write SQ has enough WCs (i.e., WC>0) and enough commands from which to fetch (i.e., WFP<QP). If the write SQ does have enough WCs and at least one write command to fetch, the controller fetches the next write command from WFP and increments the WFP. When the command arrives, if the command is a write command, the WC is decremented in accordance with the command length. Generally speaking, for the read SQ, if write fetching could not have been performed (i.e., lack of credits or queued commands), or after the write command has been performed, the same is repeated for the read fetching.

Once the write fetching and read fetching are complete (or skipped) the controller checks if the time-slot has been completed, if the time-slot has not been completed, the fetching process is repeated (for both writes and reads). If the time-slot has been completed new credits are allocated.

In another embodiment, the read SQ might have priority over the write SQ so that the read SQ is executed first. In another embodiment, when both reads and writes have credits (WC>0 and RC>0), and the RFP is equal to the WFP (WFP=RFP), a single fetch can be done to service both the read SQ and the write SQ. Furthermore, it is possible to prioritize the lower pointer (i.e., if WFP<RFP then the process will be repeated for the WFP until it reaches the RFP where both pointers might be advanced together). In yet another embodiment, the flow can be done over multiple SQs, sharing the same tenant/function. The credit counters (WC, RC) will be per tenants while the pointers will be per SQ. In another embodiment, the data storage device might "learn" that for a given tenant one or more SQs are used solely for reads, and one of more SQs are used solely for writes and then "disable" the non-relevant read SQ or write SQ functionality, until such case that the rule is broken.

Figure 10:
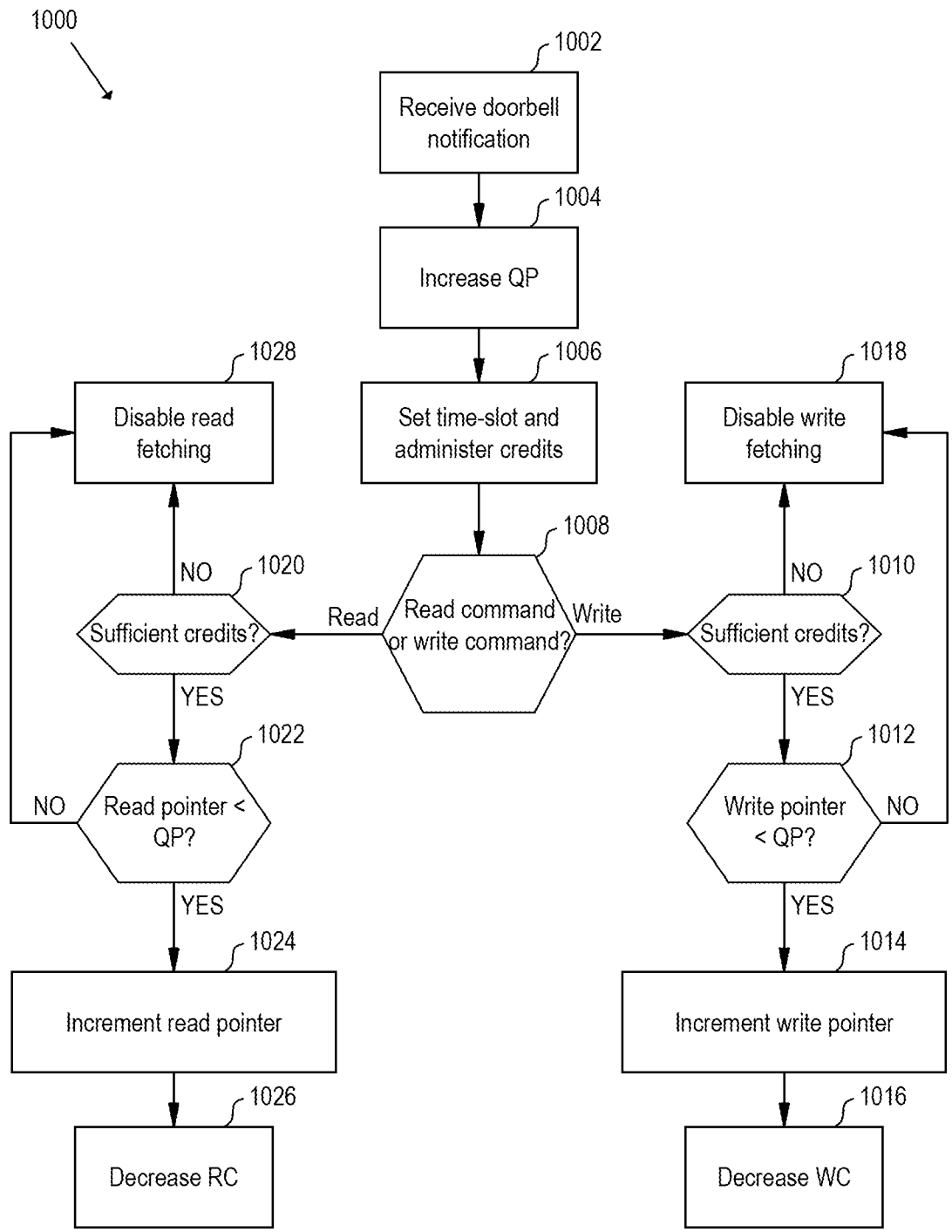
FIG. 10 is flowchart illustrating a split SQ algorithm according to another embodiment.

FIG. 10 is a flowchart 1000 illustrating a split SQ algorithm according to another embodiment. Initially, the data storage device, and more specifically the controller of the data storage device, receives a notification that a host device or tenant has rung the doorbell or sends an interrupt at 1002. The controller then fetches the command and increases QP to a new value at 1004 and sets the time-slot and administers write and read credits at 1006.

Upon fetching the command and determining at 1008 that the command is a write command, the controller determines whether there are sufficient WCs at 1010. If there are sufficient WCs, then a determination is made regarding whether the WFP is less than the QP at 1012. It is important to note that 1010 and 1012 may occur in any order. If the answer is no at either 1010 or 1012, then the write fetching is disabled at 1018. If there are sufficient WCs and the WFP is less than the QP, then the WFP is increased at 1014 followed by decrementing the WCs by the command length at 1016.

Upon fetching the command and determining at 1008 that the command is a read command, the controller determines whether there are sufficient RCs at 1020. If there are sufficient RCs, then a determination is made regarding whether the RFP is less than the QP at 1022. It is important to note that 1020 and 1022 may occur in any order. If the answer is no at either 1010 or 1012, then the read fetching is disabled at 1028. If there are sufficient RCs and the RFP is less than the QP, then the RFP is increased at 1024 followed by decrementing the RCs by the command length at 1026.

By utilizing separate RFPs and WFPs, read and write balancing occurs based upon a function mix of both directions in the same SQ. Doing so allows better quality of service (QoS) for tenants that prefer to share read and write commands in the same SQ.

In one embodiment, a data storage device comprises: a first memory device; and a controller coupled to the memory device, wherein the controller is configured to: receive a command from a host device; increase a QP; provide WCs and RCs; determine that either: a WFP is less than the QP and a WC is greater than 0; or a RFP is less than the QP and a RC is greater than 0; process the command; increment either: the WFP by 1; or the RFP by 1; and decrement either the WC or the RC. The controller is configured to start a time-slot counter. The controller is configured to determine whether the time-slot is over. The controller is configured to issue new WCs and new RCs upon determining the time-slot is over. The command is a write command and the controller is configured to: determine that: the WFP is less than the QP; and the WC is greater than 0; increment the WFP by 1; and decrement the WC. The controller is further configured to: determine that: the RFP is less than the QP; and the RC is greater than 0; and increment the RFP by 1. The controller is further configured to not increment the RFP by 1. The controller is further configured to: determine that the RC is not greater than 0. The command is a read command and the controller is further configured to: determine that: the WFP is less than the QP; and the WC is greater than 0; and not decrement the WC. The controller is further configured to: determine that: the RFP is less than the QP; and the RC is greater than 0; increment the RFP by 1; and decrement the RC.

In another embodiment, a data storage device comprises: a memory device; and a controller coupled to the memory device, wherein the controller is configured to: retrieve a command from a SQ; treat the SQ as two separate SQs including a first write SQ and a first read SQ; allocate WCs to the first write SQ; allocate RCs to the first read SQ; process write commands when WCs are greater than 0 and RCs are equal to or greater than 0; and process read commands when RCs are greater than 0 and WCs are equal to or greater than 0. The controller is configured to retrieve a write command or a read command in a single fetch and handle both write fetch pointers (WFPs) and read fetch pointers (RFPs) for the single fetch. The SQ is a plurality of SQs and wherein each SQ is treated as two separate SQs including a write SQ and a read SQ. WCs and RCs are per tenant and pointers are per SQ. The controller is configured to disable either first write SQ functionality or first read SQ functionality. The first read SQ has priority over the first write SQ. The controller is configured to fetch another command upon determining that a time-slot has not completed.

In another embodiment, a data storage device comprises: memory means; a controller coupled to the memory means, wherein the controller is configured to: treat a SQ as a write SQ and a separate read SQ; allocate one or more credits to the write SQ and the read SQ; and one or more of the following: advance a WFP, wherein the WFP is advanced if the following conditions are met: the WFP is less than a QP and a RFP; and WCs are greater than 0; and advance a RFP, wherein the RFP is advanced if the following conditions are met: the RFP is less than the QP and WFP; and RCs are greater than 0. The controller is configured to advance both the RFP and the WFP when WFP=RFP, WC>0, and RC>0. The RFP equals the WFP and wherein the RFP is less than the QP.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
  a memory device; and
  a controller coupled to the memory device, wherein the controller is configured to:
    receive a command from a host device;
    increase a queue pointer (QP);
    provide write credits (WCs) and read credits (RCs);
    determine that either:
      a write fetch pointer (WFP) is less than the QP and a WC is greater than 0; or
      a read fetch pointer (RFP) is less than the QP and a RC is greater than 0;
    process the command;
    increment either:
      the WFP by 1; or
      the RFP by 1; and
    decrement either the WC or the RC.

2. The data storage device of claim 1, wherein the controller is configured to start a time-slot counter.

3. The data storage device of claim 2, wherein the controller is configured to determine whether the time-slot is over.

4. The data storage device of claim 3, wherein the controller is configured to issue new WCs and new RCs upon determining the time-slot is over.

5. The data storage device of claim 1, wherein the command is a write command and the controller is configured to:
  determine that:
    the WFP is less than the QP; and
    the WC is greater than 0;
  increment the WFP by 1; and
  decrement the WC.

6. The data storage device of claim 5, wherein the controller is further configured to:
  determine that:
    the RFP is less than the QP; and
    the RC is greater than 0; and
  increment the RFP by 1.

7. The data storage device of claim 6, wherein the controller is further configured to not increment the RFP by 1.

8. The data storage device of claim 5, wherein the controller is further configured to: determine that the RC is not greater than 0.

9. The data storage device of claim 1, wherein the command is a read command and the controller is further configured to:
  determine that:
    the WFP is less than the QP; and
    the WC is greater than 0; and
  not decrement the WC.

10. The data storage device of claim 9, wherein the controller is further configured to:
  determine that:
    the RFP is less than the QP; and
    the RC is greater than 0;
  increment the RFP by 1; and
  decrement the RC.

11. A data storage device, comprising:
  a memory device; and
  a controller coupled to the memory device, wherein the controller is configured to:
    retrieve a command from a submission queue (SQ);
    treat the SQ as two separate SQs including a first write SQ and a first read SQ;
    allocate write credits (WCs) to the first write SQ;
    allocate read credits (RCs) to the first read SQ;
    process write commands when WCs are greater than 0 and RCs are equal to or greater than 0; and
    process read commands when RCs are greater than 0 and WCs are equal to or greater than 0.

12. The data storage device of claim 11, wherein the controller is configured to retrieve a write command or a read command in a single fetch and handle both write fetch pointers (WFPs) and read fetch pointers (RFPs) for the single fetch.

13. The data storage device of claim 11, wherein the SQ is a plurality of SQs and wherein each SQ is treated as two separate SQ including a write SQ and a read SQ.

14. The data storage device of claim 13, wherein WCs and RCs are per tenant and pointers are per SQ.

15. The data storage device of claim 11, wherein the controller is configured to disable either first write SQ functionality or first read SQ functionality.

16. The data storage device of claim 11, wherein the first read SQ has priority over the first write SQ.

17. The data storage device of claim 11, wherein the controller is configured to fetch another command upon determining that a time-slot has not completed.

18. A data storage device, comprising:
  memory means;
  a controller coupled to the memory means, wherein the controller is configured to:
    treat a submission queue (SQ) as a write SQ and a separate read SQ;
    allocate one or more credits to the write SQ and the read SQ; and
    one or more of the following:
      advance a write fetch pointer (WFP), wherein the WFP is advanced if the following conditions are met:
        the WFP is less than a queue pointer (QP) and a read fetch pointer (RFP); and
        write credits (WCs) are greater than 0; and
      advance the RFP, wherein the RFP is advanced if the following conditions are met:
        the RFP is less than the WFP and the QP; and
        read credits (RCs) are greater than 0.

19. The data storage device of claim 18, wherein the controller is configured to advance both the RFP and the WFP when WFP=RFP, WC>0, and RC>0.

20. The data storage device of claim 18, wherein the RFP equals the WFP and wherein the RFP is less than the QP.

* * * * *